July 14, 1964     A. F. SPINELLI     3,140,707
SNOW DISPOSAL APPARATUS

Filed April 13, 1961     3 Sheets-Sheet 1

INVENTOR
Anthony F. Spinelli
BY Harold E. Cole
ATTORNEY

July 14, 1964 A. F. SPINELLI 3,140,707
SNOW DISPOSAL APPARATUS
Filed April 13, 1961 3 Sheets-Sheet 2

INVENTOR.
Anthony F. Spinelli
BY Harold E. Cole
ATTORNEY

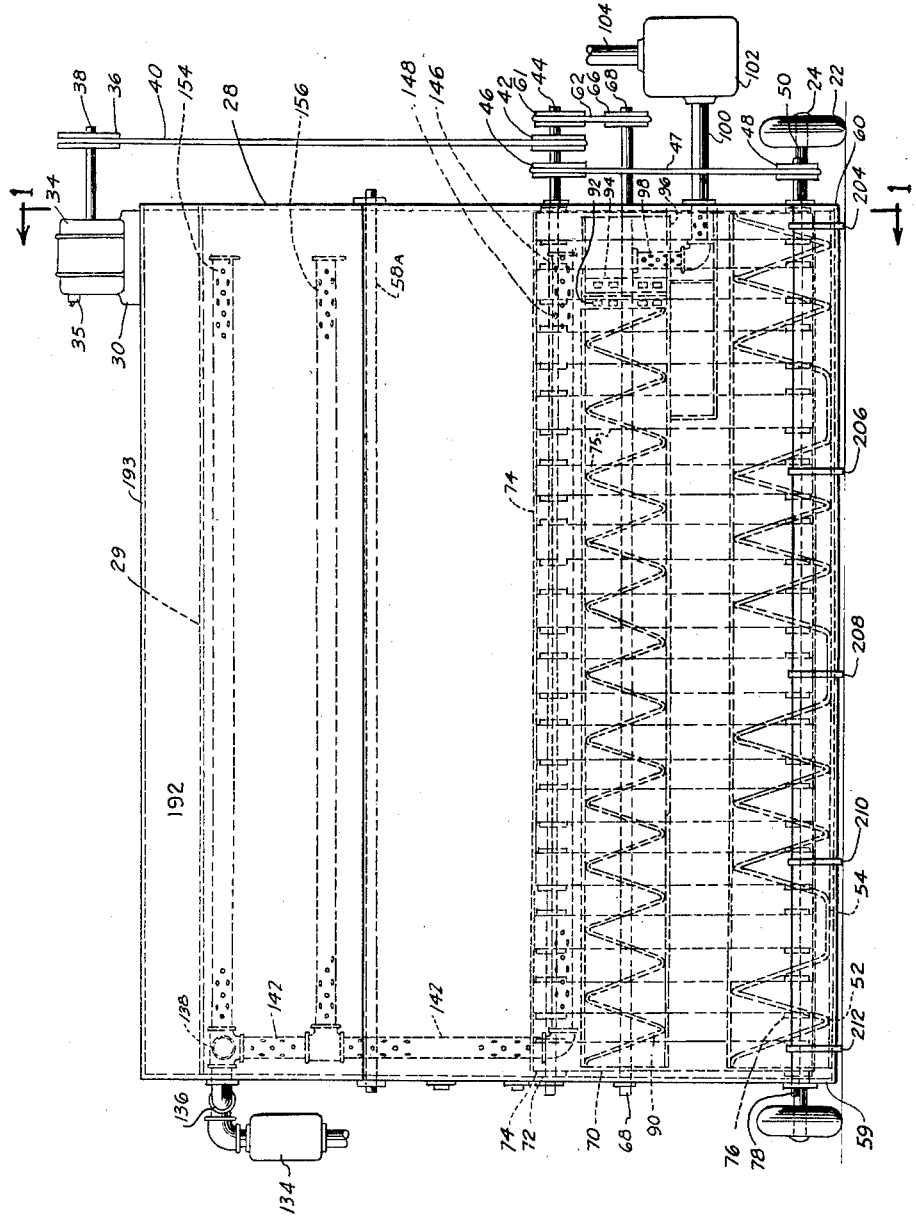

United States Patent Office 3,140,707
Patented July 14, 1964

3,140,707
SNOW DISPOSAL APPARATUS
Anthony F. Spinelli, 21 Sheridan Drive, Milton, Mass.
Filed Apr. 13, 1961, Ser. No. 102,714
1 Claim. (Cl. 126—343.5)

This invention relates to snow-disposal apparatus.

Reference is made to my pending application for snow-melting apparatus, Serial No. 87,332, filing date February 6, 1961.

One object of my invention is to provide snow-disposal apparatus that includes a receiver-screen on which snow is thrown and melted by spraying streams of hot fluid upon it and which permits escape of any unmelted snow and pieces of ice to rotating cylinders below said receiver-screen, the latter also being sprayed by hot fluid to further soften said unmelted snow and pieces of ice.

A further object is to provide a wide conveyor belt to receive slush and water passing between said cylinders and carry most of this latter material to a disposal receptacle from which it will be discharged onto the ground. This avoids constantly cooling the liquid in a tank below said conveyor belt that must be heated to provide the streams of hot fluid.

The foregoing and other objects which will appear as the nature of the invention is better understood, may be accomplished by a construction, combination and arrangement of parts such as is disclosed by the drawings. The nature of the invention is such as to render it susceptible to various changes and modifications, and, therefore, I am not to be limited to the construction disclosed by the drawings nor to the particular parts described in the specifications; but am entitled to all such changes therefrom as fall within the scope of my claims.

In the drawings:

FIG. 3, is a front elevational view of my apparatus.

Figure 1:
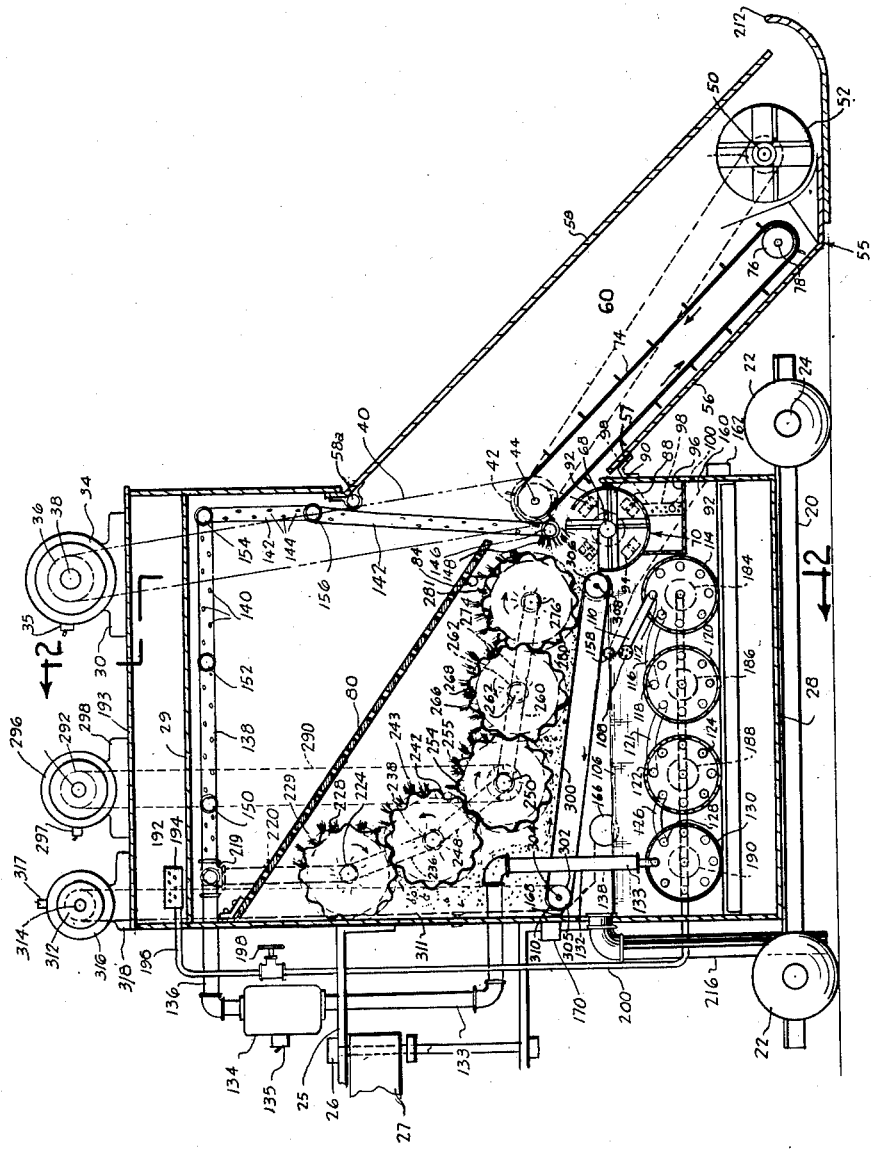
FIG. 1, is a sectional view of my apparatus taken on the line 1—1 of FIG. 2.
Figure 2:
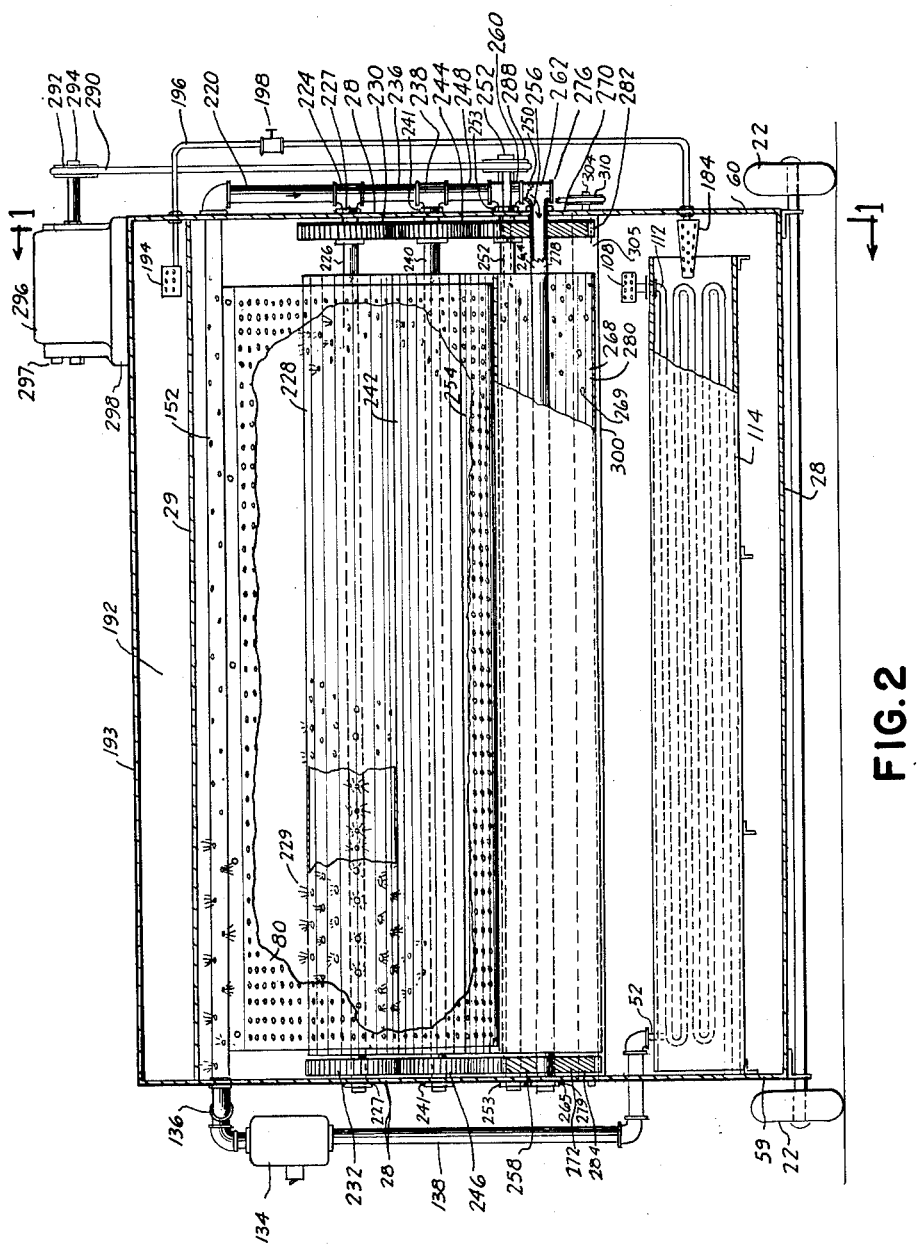
FIG. 2, is a sectional view taken on the line 2—2 of FIG. 1.

As illustrated, my apparatus has a main support or chassis 20 having wheels 22 supported by axles 24 rotatably mounted on said chassis. There is an angle attaching member 25 to receive a bolt 26 for attachment to a motor vehicle hitch 27.

My apparatus carries a tank or liquid holding receptacle 28 having a cover 29. A support 30 rests on a top 193 of a fuel tank later described, and it supports a well-known electric motor 34 having a switch 35 which may be powered by a generator carried by a motor vehicle, not shown, that is intended to push my apparatus.

A pulley 26 is rotatably mounted on a shaft 38 of said motor. A belt 40 extends from the latter to a pulley 42 which is mounted on a shaft 44. A sprocket gear 46 is mounted on said shaft 44. A chain belt 47 extends from siad sprocket gear 46 to a sprocket gear 48 fixed to a shaft 50 on which is rotatably mounted a rotary snow feeder 52 which gathers and throws snow by means of its cup feed screw 54. Said snow feeder is part of snow feeding mechanism 55 having a lower chute portion 56 slidably resting on an angle member 57 attached to said tank 28 and an upper chute portion 58 hinged to rod 58A which is attached to two side walls 59 and 60 of said snow feeding mechanism. Said hinge means enables said latter mechanism to raise should it encounter obstacles as it travels.

A sprocket gear 61 is mounted on said shaft 44 from which a chain belt 62 extends to a sprocket gear 66 mounted on a shaft 68 of a disposal screw device 70 later explained.

Said shaft 44 has a cylinder 72 fixedly mounted around it and a wide, cleated conveyor belt 74 having reinforcing members 75, runs over said cylinder 72 and over a wide idler pulley 76 mounted on a shaft 78 set in said side walls 59 and 60. Any slush, ice or the like that is not thrown upwardly by said snow feeding mechanism to a receiver screen 80, later described, will fall on said conveyor belt 74 and is carried upwardly thereon to said disposal device 70.

Said receiver screen 80 receives snow thrown onto it from said snow feeding mechanism. It is attached to a side wall of said tank 28 at one end, and is supported by a rod 84 mounted on opposite sides of said tank 28.

Said disposal screw device 70 has a perforated casing or receptacle 88 in which is set a conveyor screw 90 driven by said shaft 68. At one end of said screw conveyor 90 is a cutter 92 attached to shaft 68. Another cutter 94 is fixedly attached to said casing 88. These cutters 92 and 94 cut into small pieces any ice or hard snow received by said disposal device 70, the upper part of which is open to receive said ice or hard snow.

Below said disposal device 70 is a disposal receptacle 96 from which water and articles pass. A strainer conduit 98 communicates with the latter and a conduit 100 which latter connects with a discharge pump 102 that discharges water from said tank 28 and disposal device 70. Said pump 102 has a discharge pipe 104.

Some of the water resulting from melting of snow passes from said receiver screen 80 and from conveyor belt 300 into said tank 28. When water reaches a strainer 108 it flows into a feed conduit 110 that communicates with a coil 112 having several reverse lengths of pipe. Said coil 112 is enclosed by a casing 114. From said coil 112 water passes to a connector conduit 116 to a coil 118 having a casing 120. From said coil 118 the water then flows to a connector 121 to another coil 122 having a casing 124. From said coil 122 the water passes to a connector 126 to another coil 128 having a casing 130. An outlet conduit 132 communicates with a conduit 133 and with an electric pump 134 controlled by a switch 135 from which water is pumped to another supply conduit 136 communicating with a distributor conduit 138 having discharge ports 140 through which hot water is forced to thereby melt snow on said screen receiver 80.

A branch distributor conduit 142 continues from conduit 138 and has discharge ports 144 through which hot water is forced diagonally downward to spray snow on the receiver screen 80 and thus aid in melting it.

At the bottom of said discharge conduit 142 is a horizontal branch conduit 146 having discharge ports 148. Three horizontal branch conduits, 150, 152 and 154 extend from said conduit 138 and a horizontal branch conduit 156 extends from said conduit 142. Said horizontal conduits extend across said tank 28, each spraying hot water on the snow accumulated on said receiver screen 80.

When water reaches the water level line 106, a float 158 is actuated that is connected by an arm 160 extending to an electric switch 162 that is attached to said tank 28 and controls operation of said discharge pump 102. This takes care of any excess water which will flow into said disposal device 70 and thence into said pump 102.

A ball cock 166 is connected by an arm 168 to an electric switch 170 that is attached to a wall of said tank 28. This switch 170 controls the flow of water through said circulating pump 134, shutting the pump off in case the water drops appreciably below said water level 106 for instance.

To heat the water passing through said coils 112, 118, 122 and 128 a torch burner 184 extends to said coil 112 throwing a flame between and around different pipe lengths forming it. For said coil 118 the burner is 186;

for said coil 122 the burner is 188; and for said coil 128 the burner is 190.

The fuel for said four burners is stored in a receptacle 192 having a top 193 attached to said tank 28. Said fuel flows through a strainer 194 from said receptacle 192 into a conduit 196 having a well-known regulating valve 198 connected thereto. A distributor conduit 200 extends from said conduit 196 and delivers fuel to said torch burners 190, 188, 186 and 184. Said casings 114, 120, 124 and 130 are open at both ends, being fitted in circular cut-outs in opposite sides of said tank 28 and welded to the latter.

Attached to said snow feeding mechanism 55 are five sled runners, 204, 206, 208, and 210 and 212 on which my apparatus slides as it gathers snow along a traveled way.

Should water in said tank accumulate to a predetermined point, there is an over-flow pipe 216 connected to the tank, so it will run off onto the ground.

Below said screen 80 are rotatable cylinders that are in contact, as later described, which are supplied with hot water from said conduit 220 that connects by a T 219 to conduit 136, and also that connects with a T 224 in which the end of a hollow shaft 226 rotatably fits. Said latter shaft has discharge ports, and is set in well-known roller bearings 227 which are mounted in opposite side walls of said tank 28. Fixed to said hollow shaft 226 is a hollow cylinder or casing 228 to hold water and that is corrugated on the exterior surface and has ports 229 for the discharge of hot water therefrom. Said shaft 226 extends through and beyond said cylinder 228 and at opposite ends it has gears 230 and 232 that are welded or otherwise attached to said shaft.

A conduit 236 connects with said T 224 and to a T 238 in which hollow shaft 240 rotatably fits. Said shaft 240 is mounted in well known roller bearings 241 that are supported by opposite side walls of said tank 28. Fixed to said hollow shaft 226 is a hollow cylinder or casing 242 to hold water, that is corrugated on the exterior surface, contacts said cylinder 228, and has ports 243 to discharge water. Said shaft 240 extends through and beyond said cylinder 242 and at opposite ends it has gears 244 and 246 that are welded or otherwise attached to said shaft and mesh respectively with said gears 230 and 232.

A conduit 248 connects with said T 238 and with a T 250 and a hollow drive shaft 252 rotatably fits in said T 250. Said shaft 252 is mounted in well-known roller bearings 253 that are supported by opposite side walls of said tank 28. Fixed to said hollow shaft 252 is a hollow cylinder or casing 254 to hold water and that is corrugated on the exterior surface and has ports 255 to discharge water. Said shaft 252 extends through and beyond said cylinder 254 and at opposite ends it has gears 256 and 258 that are welded or otherwise attached to said shaft 252 and mesh respectively with said gears 244 and 246.

A conduit 260 connects with said T 250 and with a T 262 and a hollow shaft 264 rotatably fits in said T 262. Said shaft 264 is mounted in well-known roller bearings 265 that are supported by opposite side walls of said tank 28. Fixed to said hollow shaft 264 is a hollow cylinder or casing 268 to hold water that is corrugated on the exterior surface and has ports 269 to discharge water. Said shaft 264 extends through and beyond said cylinder 268 and at opposite ends it has gears 270 and 272 that are welded or otherwise attached to said shaft and mesh respectively with said gears 256 and 258.

A conduit 274 connects with said tee 262 and with a tee 276, and a hollow shaft 278 rotatably fits in said tee 276. Said shaft 278 is mounted in well-known roller bearings 279 that are supported by opposite side walls of said tank 28. Fixed to said hollow shaft 278 is a hollow cylinder or casing 280 to hold water that is corrugated on the exterior surface and has ports 281 to discharge water. Said shaft 278 extends through and beyond said cylinder 280 and at opposite ends it has gears 282 and 284 that are welded or otherwise attached to said shaft and mesh respectively with said gears 270 and 272.

The arrows shown on said five cylinders of said FIG. 1, indcate the direction of rotation of the aforesaid gears, all being driven by means of said drive shaft 252.

Said shaft 252 has a pulley 288 thereon that is operated by a belt 290 connected to a pulley 292 mounted on a shaft 294 of a motor 296 having a switch 297 and resting on a base 298 attached to said top 193.

A wide conveyor belt 300 is rotated by a wide roller 302 driven by a shaft 304 rotatably set in the side walls of said tank 28. A wide idler 306 mounted on a shaft 308, rotatably supported by the walls of said tank, has said belt 300 running over it. A pulley 310 on said drive shaft 304 is rotated by a belt 311 connected to a pulley 312 mounted on a motor shaft 314 of a motor 316 having a switch 317 resting on a base 318 fixed to said top 193.

In operation, said tank 28 is filled with water or other liquid, somewhat above the water line 106, said valve 198 is opened, said torches are ignited, and my apparatus remains stationary until the water in the coils is hot. Then said circulating pump 134 is turned on, the motor 34 is turned on which results in rotation of said shaft 44 and other connected parts as previously explained. Also motor 296 is turned on which rotates drive shaft 252, as is motor 316 which drives shaft 304.

My apparatus is then pushed forward by a vehicle at the rear and said rotary snow feeder 52 gathers snow from the ground, throwing it onto said receiver screen 80 to be melted. Since said snow feeding mechanism is quite well enclosed the snow will be mostly deflected onto said receiver screen 80. Any material such as heavy particles and any snow that does not reach said receiver screen falls on said wide conveyor belt 74 from which it is delivered to said disposal screw device outer receptacle 88. Said conveyor screw 90 delivers said material to said cutters 92 and 94 where any solid material is ground so all said material will pass into said receptacle 96 and pass through said strainer 98 into said conduit 100 and be discharged through said pump 102 and pipe 104 onto the ground.

Water passes from said tank 28 as explained to said conduit 110 through said coils, where it is heated as explained, finally reaching the said various distributor conduits that discharge hot water onto the receiver screen 80 and other parts, as explained to melt the snow.

Some of said ports 148 in said branch conduit 146 spray hot water on said conveyor belt 74 thus cleaning it. Also hot water from some ports 148 melts or reduces any pieces of snow or ice that originally may be too large to pass into said disposal receptacle 88.

Snow and pieces of ice falling through holes in said screen 80 pass onto said cylinders 228, 242, 254, 268 and 280, the corrugations of which mesh with each other. These cylinders press the snow and pieces of ice between them and then they pass onto said wide conveyor belt 300 in the form of thin ribbons of slush and water. Hot water passing into said cylinders from the conduits, T's and hollow shafts heretofore described, discharges through said cylinder ports onto the snow and pieces of ice that reach said cylinders, further disintegrating it.

The water and slush reaching the wide conveyor belt 300 is mostly delivered into said receptacle 88 from which it flows through said pump 102 to the discharge pipe 104. Enough water will pass through perforations in said receptacle 88 and off said conveyor belt 300 to supply sufficient water in the tank 28 to continuously provide the necessary water to maintain said water line 106.

What I claim is:

Snow melting apparatus comprising a tank adapted to receive snow delivered at a point adjacent the front wall thereof, an inclined stationary screen in said tank extending upwardly from said delivery point and adapted to receive snow thrown above said delivery point, a plurality of rotary corrugated intermeshing cylinders in said tank disposed below said inclined screen arranged to receive snow passing from said screen and to press the same between said intermeshing corrugations, means to distribute a snow melting medium onto said screen, said cylinders being hollow and having openings therein and mounted on hollow shafts having ports communicating with said distributing means whereby the snow melting medium may pass through said openings onto snow passing from said receiving screen, a disposal device in said tank arranged to receive snow delivered adjacent said front wall, and an inclined moving belt disposed below said cylinders and arranged to direct any snow passing onto the conveyor into said disposal device.

References Cited in the file of this patent
UNITED STATES PATENTS

| | | |
|---|---|---|
| 642,314 | Finigan | Jan. 30, 1900 |
| 969,716 | Muller et al. | Sept. 6, 1910 |
| 1,462,527 | Tully | July 24, 1923 |
| 1,821,292 | Chase | Sept. 1, 1931 |
| 1,841,245 | Hagen | Jan. 12, 1932 |
| 2,104,363 | Devlin | Jan. 4, 1938 |
| 2,630,637 | Smith | Mar. 10, 1953 |